D. Fasig.
Device for Seizing Animals.
N°. 89,922. Patented May 11, 1869.
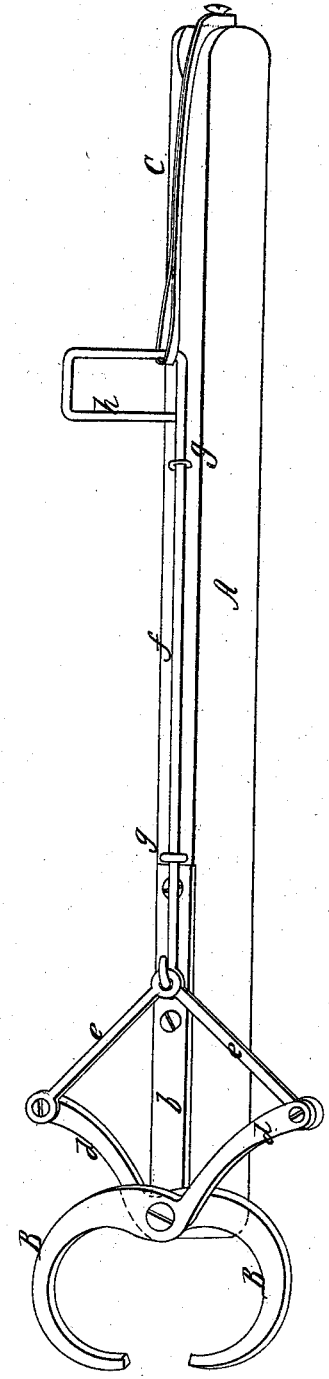
Witnesses:
Wm A Morgan
P. C. Dieterich
Inventor,
D. Fasig
per Munn & Co
Attorneys.

United States Patent Office.

DANIEL FASIG, OF ROWSBURG, OHIO.

Letters Patent No. 89,922, dated May 11, 1869.

---

IMPROVEMENT IN DEVICE FOR SEIZING ANIMALS.

---

The Schedule referred to in these Letters Patent and making part of the same.

---

*To all whom it may concern:*

Be it known that I, DANIEL FASIG, of Rowsburg, in the county of Ashland, and State of Ohio, have invented a new and improved Device for Seizing Animals; and I do hereby declare that the following is a full, clear, and exact description thereof, which will enable those skilled in the art to make and use the same, reference being had to the accompanying drawings, forming part of this specification, in which the drawing represents a perspective view of my invention.

This invention relates to implements or devices employed in seizing any particular animal from a group or number confined in a pen or small lot It is designed, more particularly, for seizing hogs, when any one or a number is selected, and is to be separated from the main body for slaughter or sale.

It consists of a long rod, or handle, A, bearing a pair of prehensive horns, B B, which are curved toward each other, as shown, and are pivoted by the same pivot-screw or rivet $a$ to a plate, $b$, affixed to the handle A, as shown.

The horns B are formed with extensions $d$, which begin from the pivot $a$, and extend backward in such a manner as to diverge from each other, as shown.

The outer ends of these extensions are pivoted to links $e$ $e$, which, in turn, are pivoted to the end of the same rod $f$, extending along the handle A, and sliding freely in staples $g$ $g$, one or more, affixed to the said handle.

The rod $f$, at the end opposite the links $e$, terminates in a handle, $h$, which is formed by bending the rod, as shown.

This handle $h$ is connected with the end of the rod, or handle A, by means of an elastic strap or coiled wire spring, C, the force of which is thus exerted to draw the horns B together.

In using this device, the handle A is held in one or both hands, the thumb of one hand being employed in pushing up the handle $h$, and thus keeping the horns open while they are brought against one of the legs of a hog.

The thumb is then removed from the handle $h$, and the horns thus permitted to embrace the leg.

The handle $h$ being then held firmly, to keep the horns closed, the hog is drawn out from among the others.

I claim as new, and desire to secure by Letters Patent—

The curved horns B and extensions $d$, in combination with the handle A, plate $b$, links $e$, rod $f$, loop $h$, and elastic strap C, all arranged as described for the purpose specified.

DANIEL FASIG.

Witnesses:
C. S. McENTIRE,
J. E. CAMPBELL.